J. C. GORDON.
MILKING MACHINE.
APPLICATION FILED SEPT. 26, 1913.

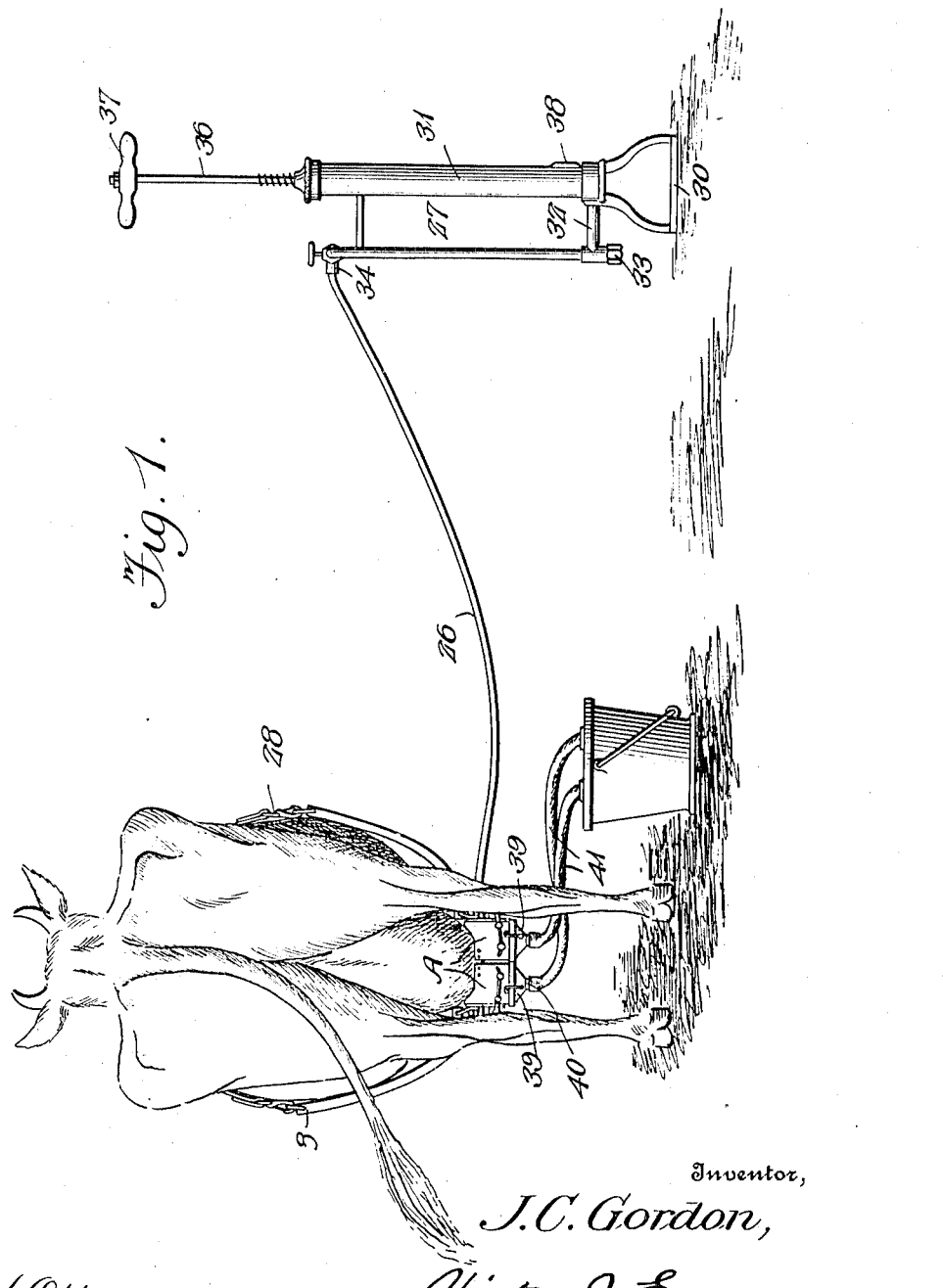

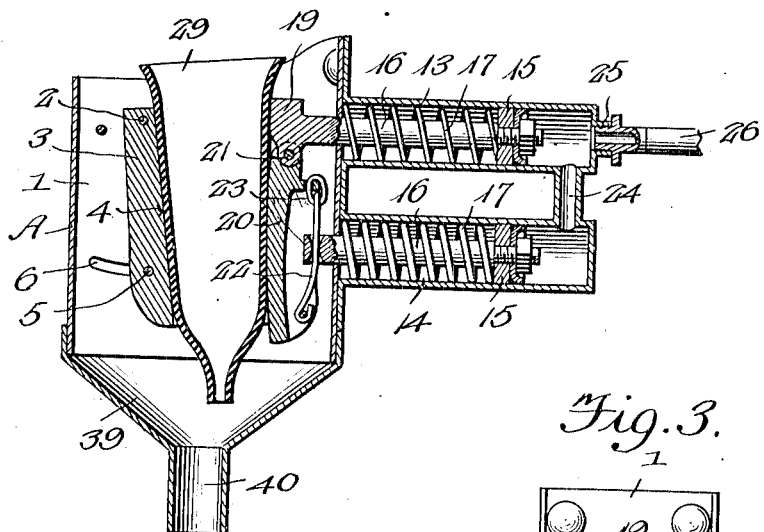
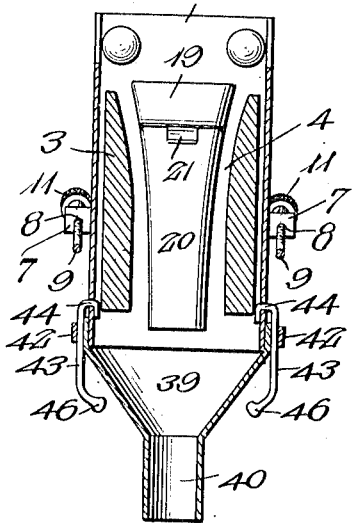
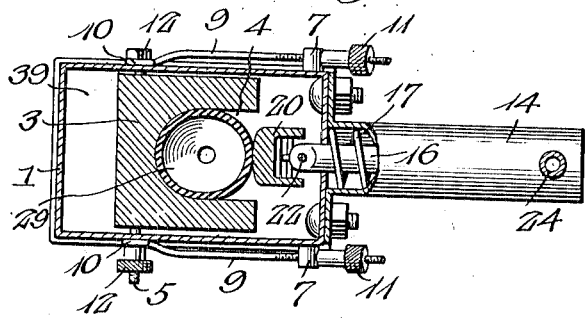

1,106,202.

Patented Aug. 4, 1914.

3 SHEETS—SHEET 3.

Witnesses
Hugh H. Ott
John J. McCarty

Inventor,
J. C. Gordon,
By Victor J. Evans
Attorney

UNITED STATES PATENT OFFICE.

JAMES C. GORDON, OF CALGARY, ALBERTA, CANADA.

MILKING-MACHINE.

1,106,202. Specification of Letters Patent. Patented Aug. 4, 1914.

Application filed September 26, 1913. Serial No. 792,018.

*To all whom it may concern:*

Be it known that I, JAMES C. GORDON, a citizen of Canada, residing at Calgary, in the Province of Alberta and Dominion of Canada, have invented new and useful Improvements in Milking-Machines, of which the following is a specification.

This invention relates to improvements in milking machines and has particular application to fluid operated milking machines.

In carrying out the present invention, it is my purpose to provide a fluid operated milking machine whereby the teats will be manipulated substantially as in manual milking and wherein the devices for producing the required manipulating actions will be so arranged and correlated as to perform the milking operation evenly and uniformly and without derangement of the parts.

It is also my purpose to provide a fluid operated milking machine which will embrace the desired features of simplicity, efficiency and durability, one which may be manufactured and marketed at a minimum expense and which may be readily and conveniently applied and removed.

With the above and other objects in view, the invention consists in the construction, combination and arrangement of parts hereinafter set forth in and falling within the scope of the claims.

Figure 7:
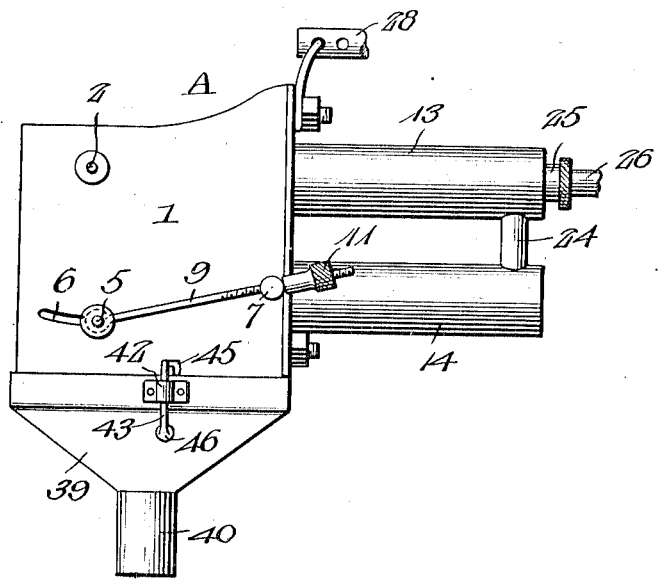
Figure 6:
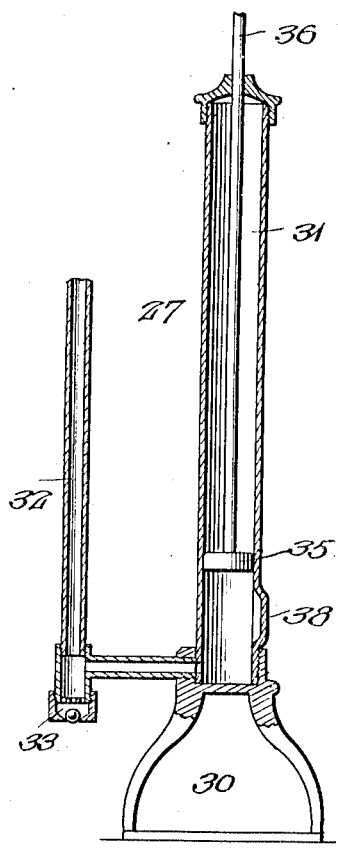
Figure 5:
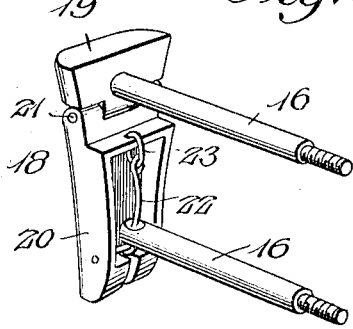

In the accompanying drawings: Figure 1 is a view in elevation showing my invention in applied position; Fig. 2 is an enlarged vertical sectional view through the teat press. Fig. 3 is a similar view taken at right angles to Fig. 2. Fig. 4 is a horizontal sectional view through the press. Fig. 5 is a perspective view of the plunger of the press. Fig. 6 is a vertical sectional view through the pump. Fig. 7 is a view in side elevation of the teat press.

Referring now to the accompanying drawings in detail, A designates a teat press comprising an outer casing or shell 1 preferably of rectangular contour in cross section and constructed of any suitable material. Passed through the side walls of the casing 1 adjacent to one end and the top edge thereof is a pivot rod 2 carrying a block 3 depending into the casing and cut out to form a vertical well 4 designed to receive the teat and of a configuration corresponding to the contour thereof. Extending transversely through the block 3 adjacent to the lower end thereof is a rod 5 having the opposite ends thereof extending through arcuate shaped slots 6 formed in the opposite sides of the casing 1. Swiveled to the opposite side walls of the shell or casing 1 and suitably spaced apart from the arcuate shaped slots 6 are heads 7, 7 each formed with a bore 8 through which is passed an adjusting rod 9 having one end formed to provide an eye 10 and encircling the adjacent end of the rod 5 and the opposite end screw threaded to receive a take-up nut 11. Threaded onto the opposite ends of the rod 5 to maintain the connections between the adjusting rods 9, 9 are nuts 12. By means of this construction, it will be seen that when the take-up nuts 11 are rotated in one direction upon the adjusting rods 9, motion will be transmitted to the rod 5 to swing the block 3 about the pivot rod 2 in one direction, while when the rotation of the take-up nuts is reserved the rods may be swung in the opposite direction.

One side of the well 4 opens onto one side edge of the block 3 and extending outwardly from the adjacent end wall of the casing 1 are horizontal cylinders 13, 14 disposed one above the other and within each cylinder is mounted for sliding movement a piston 15. Connected to each piston 15 and extending outwardly of the inner end of the cylinder and into the casing 1 is a piston rod 16 while surrounding each piston rod within the respective cylinder is a coiled expansion spring 17 having one end abutting the inner face of the piston and the opposite extremity in engagement with the inner end of the cylinder, such springs serving to hold the pistons at the outer ends of the cylinders, the springs within the lower cylinder 14 being of greater strength than the springs in the upper cylinder 13.

18 designates what may be termed a plunger comprising two sections 19, 20 pivotally connected to each other through the medium of a knuckle joint 21. This plunger is arranged in proximity to the open side of the well 4 and the section 19 thereof is rigidly secured to the inner end of the rod 16 connected to the piston within the cylinder 13, while the lower section 20 of the plunger is equipped with a rod 22 passed through an eye 23 formed in the inner end of the piston rod 16 within the lower cylinder, the rod 22 and the eye 23 effecting a sliding connection between the piston within the lower cylinder and the respective section of the plunger. The outer extremities of the cylinders 13 and 14 are connected to each other through the medium of a short section of pipe 24, while the outer end of the cylinder 13 is provided with a nipple 25 connected through the medium of a hose 26 with an air pump 27.

The numeral 28 designates a suitable form of body harness designed to encircle the back of the cow and connected with the casing 1 of the teat press so as to hold the latter in applied position. A teat cup 29 composed of rubber or other yieldable material is seated within the well 4 and the block 3 so as to receive the animal's teat. Connected to the lower edge of the shell or casing 1 is a hopper-shaped bottom 39 formed with a discharge opening 40 coaxial with the well 4 in the block 3 and opening into a tube 41 adapted to convey the milk to a bucket or like receptacle. In the present instance, the bottom 39 is detachably connected with the lower edge of the shell or casing and for this purpose has the opposite sides thereof equipped with sleeves 42 within which are rotatably mounted shanks 43 having the upper ends thereof bent at right angles to themselves to provide hooks 44 designed to engage slots 45 formed in the opposite side walls of the casing 1 adjacent to the bottom edge thereof, the lower ends of the shanks 43 being equipped with manipulating knobs 46 whereby the shanks may be rotated to move the hooks into and out of engagement with the slots.

In practice, each shell or casing is suspended from the body of the animal through the medium of the harness 28 and the respective teat placed within the cup 29, the upper edge of the casing being held in snug engagement with the bag. The air pump 27 is now placed in operation and the air enters the rear end of the upper cylinder 13 and acts upon the adjacent face of the piston therein to slide the latter within the cylinder and against the action of the respective spring 17 whereby the respective piston rod 16 moves into the casing 1 so that the upper section 19 of the plunger is forced against the cup 29 and into the well 4 in the block 3. Immediately succeeding the piston within the upper cylinder reaching the limit of its movement under the action of the air, the latter passes through the pipe 24 into the rear end of the cylinder 14 behind the piston therein with the effect to move the latter against the action of the relatively strong spring 17 so that the inner end of the piston rod within the lower cylinder is moved into the casing 1 whereby the lower section 20 of the plunger 18 is forced into engagement with the cup 29 and into the well 4 in the block 3. Thus, the teat is manipulated substantially as in manual milking, incident to the lower section of the plunger acting upon the teat subsequently to the upper section, the rod 22 and the eye 23 permitting the lower section to move upwardly incident to the inward movement of the section 19.

In the present instance, the pump 27 is manually operated and comprises a base 30 and a vertical cylinder 31 upstanding from the base. Connected to the lower end of the cylinder 31 is an air tube or conduit 32 provided with a check valve 33 and with valved nipples 34 whereby a number of the teat presses may be operated from a single source of pressure. Mounted for reciprocation within the cylinder 31 is a plunger 35 having the plunger rod 36 thereof extending outwardly of the upper end of the cylinder and equipped with a handle 37. At a point adjacent to the connection with the conduit 32 the cylinder 31 is provided with an air release valve 38.

From the foregoing description taken in connection with the accompanying drawings, the construction, mode of operation and manner of employing my invention will be readily apparent. It will be seen that I have provided a milking machine whereby the teats are manipulated substantially as in manual milking, incident to the plunger of the teat press being formed of sections actuated one after the other.

I claim:

1. In a milking machine, a teat press comprising a sectional plunger adapted to manipulate a teat, fluid pressure cylinders, connections between said cylinders, a piston in each cylinder, a piston rod connected to each piston and to one of the sections of said plunger, a spring within each cylinder and holding the piston therein normally against movement under the action of fluid pressure and of a strength different from that of the spring in the other cylinder, and a source of fluid supply for said cylinders whereby the pistons therein will be actuated successively against the action of the springs.

2. In a milking machine, a teat press comprising a sectional plunger adapted to manipulate a teat, fluid pressure cylinders, a connection between said cylinders, a piston in each cylinder, a piston rod connected to each piston and to one of the sections of said plunger, a tension device within each cylinder and holding the piston therein normally against movement under the action of the fluid pressure and of a strength different from that of the tension device in the other cylinder, and a source of fluid supply for said cylinders whereby the pistons therein will be actuated successively against the action of the springs.

3. In a milking machine, a teat press comprising a sectional plunger adapted to manipulate a teat, fluid pressure cylinders, a connection between said cylinders, a piston in each cylinder, a connection between each piston and one of the sections of said plunger, means in each cylinder holding the piston therein normally against movement under the action of the fluid pressure and of a strength different from that of the means in the other cylinder, and a source of fluid supply for said cylinders whereby the pistons therein will be actuated successively against the action of the springs.

In testimony whereof I affix my signature in presence of two witnesses.

JAMES C. GORDON.

Witnesses:
E. S. HOTCHKISS,
OSCAR H. TWETEN.